(12) United States Patent
Zhang et al.

(10) Patent No.: US 8,867,414 B2
(45) Date of Patent: Oct. 21, 2014

(54) METHOD AND APPARATUS FOR INTERACTION OF CELL-SPECIFIC AND USER-EQUIPMENT-SPECIFIC SOUNDING REFERENCE SIGNAL PERIODICITY AND OFFSET

(75) Inventors: Xiaoxia Zhang, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 12/767,668

(22) Filed: Apr. 26, 2010

(65) Prior Publication Data

US 2011/0110398 A1  May 12, 2011

Related U.S. Application Data

(60) Provisional application No. 61/173,149, filed on Apr. 27, 2009.

(51) Int. Cl.
*H04J 3/00* (2006.01)
*H04L 5/00* (2006.01)

(52) U.S. Cl.
CPC .................. *H04L 5/0051* (2013.01)
USPC ........................................ 370/280; 370/328

(58) Field of Classification Search
USPC .................. 370/252, 280, 328, 329, 330, 336
See application file for complete search history.

(56) References Cited

U.S. PATENT DOCUMENTS

| 2009/0034468 A1* | 2/2009 | Muharemovic et al. | 370/330 |
| 2009/0046582 A1* | 2/2009 | Sarkar et al. | 370/230.1 |
| 2009/0181687 A1* | 7/2009 | Tiirola et al. | 455/450 |
| 2009/0238241 A1* | 9/2009 | Hooli et al. | 375/133 |
| 2009/0274076 A1* | 11/2009 | Muharemovic et al. | 370/280 |
| 2009/0290514 A1* | 11/2009 | Muharemovic et al. | 370/256 |
| 2011/0176480 A1* | 7/2011 | Dahlman et al. | 370/328 |

FOREIGN PATENT DOCUMENTS

| TW | 200845622 A | 11/2008 |
| TW | 200849868 A | 12/2008 |

OTHER PUBLICATIONS

3rd Generation Partnership Project;Technical Specification Group CoreNetwork; IP Mu1 timedi a Call Control Protocol based on S I P and SDP; Stage 3 (Release 5) 3GPP Standard; 3GPP TS 24.229, 3rd Generation Partnership Project (3GPP), Mobile Competence Centre ; 650, Route Des I Lucioles ; F-06921 Sophia-Antipolis Cedex ; France, No. V5.0.0, Mar. 1, 2002, pp. 15-47, XP050364960 * Section 5: Application usage o f S I P *.
Catt, et al., "On collision between SRS and PRACH in UpPTS and TP for 36.213" Jun. 25, 2008, 3GPP Draft; RI-082564, 3rd Generation Partnership Project (3GPP), Mobile Competence Centre ; 650, Route Des Lucioles ; F-06921 Sophia-Antipolis Cedex ; France, XP050110824.
International Search Report and Written Opinion—PCT/US2010/032479, International Search Authority—European Patent Office—Jul. 2, 2010.

(Continued)

*Primary Examiner* — Jung Park
(74) *Attorney, Agent, or Firm* — Larry Moskowitz (57) ABSTRACT

Certain aspects of the present disclosure relate to a technique for enabling transmission of sounding reference signals for uplink and downlink scheduling.

50 Claims, 9 Drawing Sheets

(56) References Cited

OTHER PUBLICATIONS

Qualcomm Europe: "On SRS Periodicity and Offset Configurations" Apr. 28, 2009, 3GPP Draft; RI-092039 SRS Periodicity and Offset Configurations, SRD Generation Partnership Project (3GPP), Mobile Competence Centre ; 650, Route Des Lucioles ; F-06921 Sophia-Antipolis Cedex ; France , XP050339507.

"3rd Generation Partnership Project; Technical Specification Group Radio Access Network; Evolved Universal Terrestrial Radio Access (E-UTRA); Physical Channels and Modulation", (Release 8), 3GPP TS 36.211 V8.6.0 (Mar. 2009).

3rd Generation Partnership Project; Technical Specification Group Radio Access Network; Evolved Universal Terrestrial Radio Access (E-UTRA); Physical layer procedures (Release 8) 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V8.6.0,Mar. 1, 2009, pp. 1-80, XP050377561.

Taiwan Search Report—TW099113341—TIPO—Jul. 22, 2013.

* cited by examiner

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

FIG. 4A

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

FIG. 4B

| SRS Configuration Index $I_{SRS}$ | SRS Periodicity $T_{SRS}$ (ms) | SRS Subframe Offset $T_{offset}$ |
|---|---|---|
| 0 – 1 | 2 | $I_{SRS}$ |
| 2 – 6 | 5 | $I_{SRS} - 2$ |
| 7 – 16 | 10 | $I_{SRS} - 7$ |
| 17 – 36 | 20 | $I_{SRS} - 17$ |
| 37 – 76 | 40 | $I_{SRS} - 37$ |
| 77 – 156 | 80 | $I_{SRS} - 77$ |
| 157 – 316 | 160 | $I_{SRS} - 157$ |
| 317 – 636 | 320 | $I_{SRS} - 317$ |
| 637 – 1023 | reserved | reserved |

FIG. 5A

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10 – 14 | 5 | $I_{SRS} - 10$ |
| 15 – 24 | 10 | $I_{SRS} - 15$ |
| 25 – 44 | 20 | $I_{SRS} - 25$ |
| 45 – 84 | 40 | $I_{SRS} - 45$ |
| 85 – 164 | 80 | $I_{SRS} - 85$ |
| 165 – 324 | 160 | $I_{SRS} - 165$ |
| 325 – 644 | 320 | $I_{SRS} - 325$ |
| 645 – 1023 | reserved | reserved |

METHOD AND APPARATUS FOR INTERACTION OF CELL-SPECIFIC AND USER-EQUIPMENT-SPECIFIC SOUNDING REFERENCE SIGNAL PERIODICITY AND OFFSET

CLAIM OF PRIORITY UNDER 35 U.S.C. §119

The present application for patent claims benefit of Provisional Application Ser. No. 61/173,149 filed Apr. 27, 2009, and assigned to the assignee hereof and hereby expressly incorporated by reference herein.

BACKGROUND

1. Field

Certain aspects of the present disclosure generally relate to wireless communications and, more particularly, to a method for enabling transmission of sounding reference signals for uplink and downlink scheduling.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In the 3GPP LTE systems, an access terminal may transmit sounding reference signals (SRS) to an access point to provide uplink channel quality information to be used as a basis for scheduling decisions in the access point. The access terminal may transmit cell-specific SRS and UE-specific SRS. Without coordination, transmission of cell-specific SRS and UE-specific SRS may occur at different times. If the access terminal transmits an SRS that collides with other users' data channel transmissions (PUSCH/PUCCH), resulting in performance loss of other users as well as wasting the access terminal's own transit power and causing unnecessary interference. Therefore, it can be beneficial that the access terminal coordinates interaction of cell-specific and UE-specific SRS transmission factors.

SUMMARY

Certain aspects provide a method for enabling transmission of sounding reference signals. The method generally includes analyzing user-equipment- (UE-) specific and cell-specific sounding reference signal (SRS) transmission timing factors, determining a configuration designed to avoid or at least reduce misalignment between UE-specific and cell-specific SRS transmissions, and transmitting the configuration to a device.

Certain aspects provide a method for enabling transmission of reference signals. The method generally includes receiving a configuration indicating user-equipment- (UE-) specific sounding reference signal (SRS) transmission timing, determining whether a schedule of UE-specific SRS transmission instances are in alignment with a schedule of cell-specific SRS transmission instances, and if not, taking a predetermined action.

Certain aspects provide an apparatus for wireless communications. The apparatus generally includes logic for analyzing user-equipment- (UE-) specific and cell-specific sounding reference signal (SRS) transmission timing factors, logic for determining a configuration designed to avoid or at least reduce misalignment between UE-specific and cell-specific SRS transmissions, and logic for transmitting the configuration to a device.

Certain aspects provide an apparatus for wireless communications. The apparatus generally includes logic for receiving a configuration indicating user-equipment- (UE) specific sounding reference signal (SRS) transmission timing, logic for determining whether a schedule of UE-specific SRS transmission instances are in alignment with a schedule of cell-specific SRS transmission instances, and logic for taking a predetermined action if the schedule of UE-specific SRS transmission instances is not in alignment.

Certain aspects provide an apparatus for wireless communications. The apparatus generally includes means for analyzing user-equipment- (UE-) specific and cell-specific sounding reference signal (SRS) transmission timing factors, means for determining a configuration designed to avoid or at least reduce misalignment between UE-specific and cell-specific SRS transmissions, and means for transmitting the configuration to a device.

Certain aspects provide an apparatus for wireless communications. The apparatus generally includes means for receiving a configuration indicating user-equipment- (UE) specific sounding reference signal (SRS) transmission timing, means for determining whether a schedule of UE-specific SRS transmission instances are in alignment with a schedule of cell-specific SRS, and means for taking a predetermined action if the schedule of UE-specific SRS transmission instances is not in alignment.

Certain aspects provide a computer-program product for wireless communications comprising a computer readable medium having instructions stored thereon, the instructions being executable by one or more processors. The instructions generally include instructions for analyzing user-equipment- (UE-) specific and cell-specific sounding reference signal (SRS) transmission timing factors, instructions for determining a configuration designed to avoid or at least reduce misalignment between UE-specific and cell-specific SRS transmissions, and instructions for transmitting the configuration to a device.

Certain aspects provide a computer-program product for wireless communications comprising a computer readable medium having instructions stored thereon, the instructions being executable by one or more processors. The instructions generally include instructions for receiving a configuration indicating user-equipment- (UE) specific sounding reference signal (SRS) transmission timing, instructions for determining whether a schedule of UE-specific SRS transmission instances are in alignment with a schedule of cell-specific SRS, and instructions for taking a predetermined action if the schedule of UE-specific SRS transmission instances is not in alignment.

Certain aspects provide an apparatus for wireless communications. The apparatus generally includes at least one processor configured to analyze user-equipment- (UE-) specific and cell-specific sounding reference signal (SRS) transmission timing factors, determine a configuration designed to avoid or at least reduce misalignment between UE-specific and cell-specific SRS transmissions, and transmit the configuration to a device, and a memory coupled to the at least one processor.

Certain aspects provide an apparatus for wireless communications. The apparatus generally includes at least one processor configured to receive a configuration indicating user-equipment- (UE) specific sounding reference signal (SRS) transmission timing, determine whether a schedule of UE-specific SRS transmission instances are in alignment with a schedule of cell-specific SRS, and take a predetermined action if the schedule of UE-specific SRS transmission instances is not in alignment, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
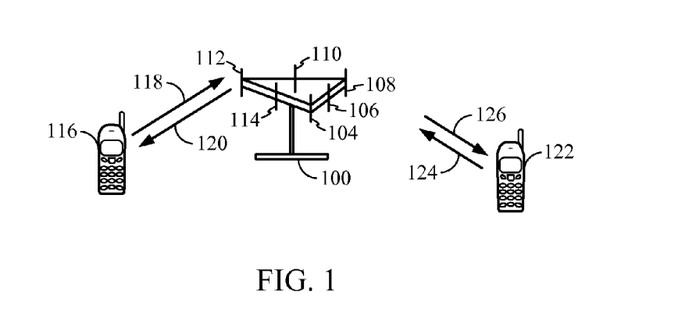
FIG. 1 illustrates an example multiple access wireless communication system in accordance with certain aspects of the present disclosure.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
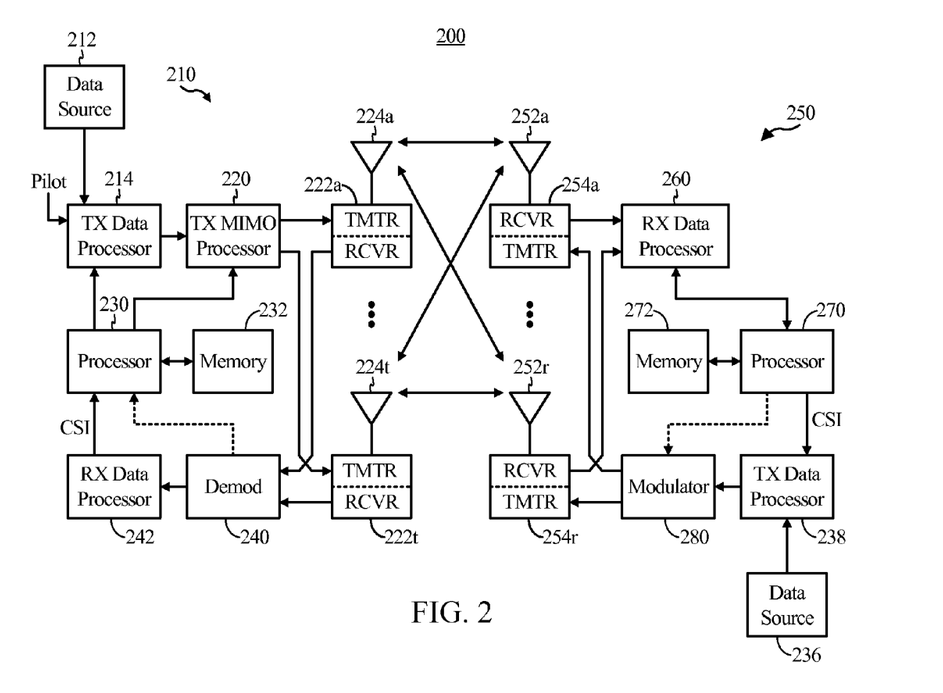
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

Figure 3:
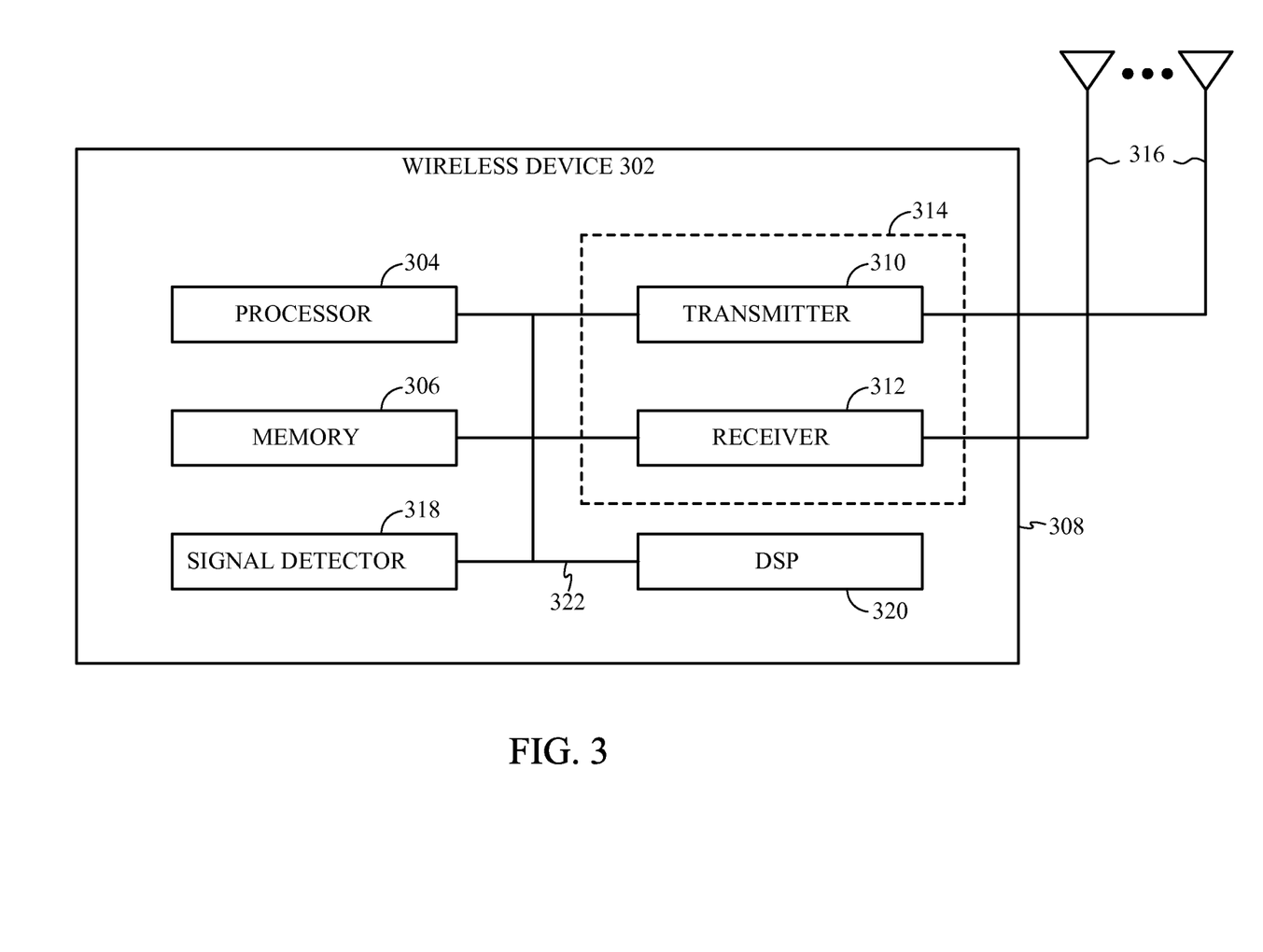
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Interaction of Cell-Specific and
User-Equipment-Specific Sounding Reference Signal
Periodicity and Offset In LTE Rel-8, a sounding reference signal (SRS) may be defined and utilized to facilitate power control and channel sounding for uplink scheduling, space-division multiple access operation, and tracking loops.

A configuration of SRS may specify a SRS specific to a cell or to a UE. A cell-specific or a UE-specific SRS may both be configured to transmit on a certain segment of bandwidth (cell SRS bandwidth) while employing a certain sub-carrier location. A cell-specific or a UE-specific SRS configuration may also set how often the SRS is transmitted (or its "periodicity") and when particularly the SRS is transmitted (or its "transmission offset").

Figure 4A:
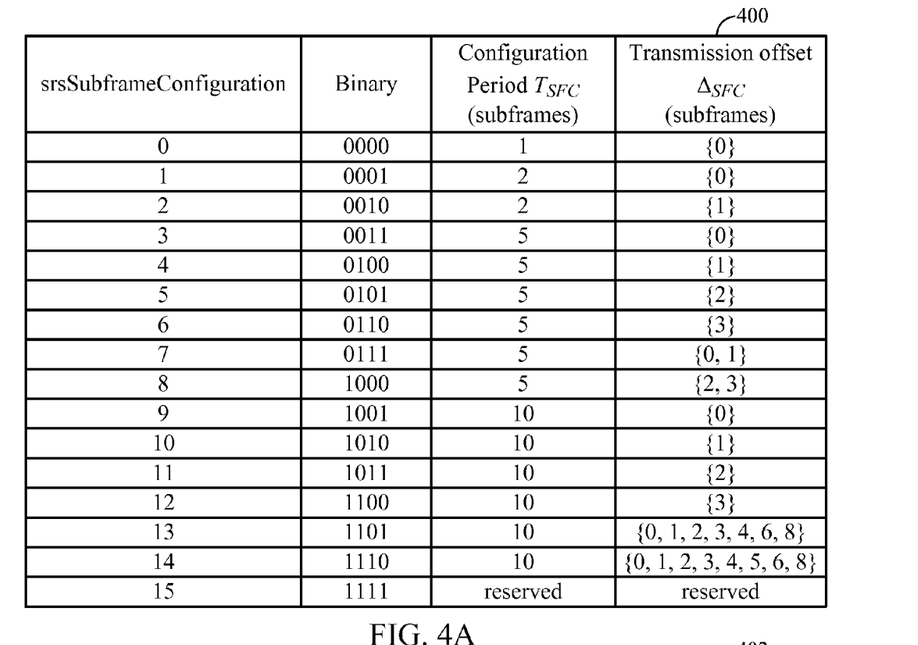
FIGS. 4A-B illustrate example configurations for frequency or time division duplex reference signal transmissions.
Figure 4B:
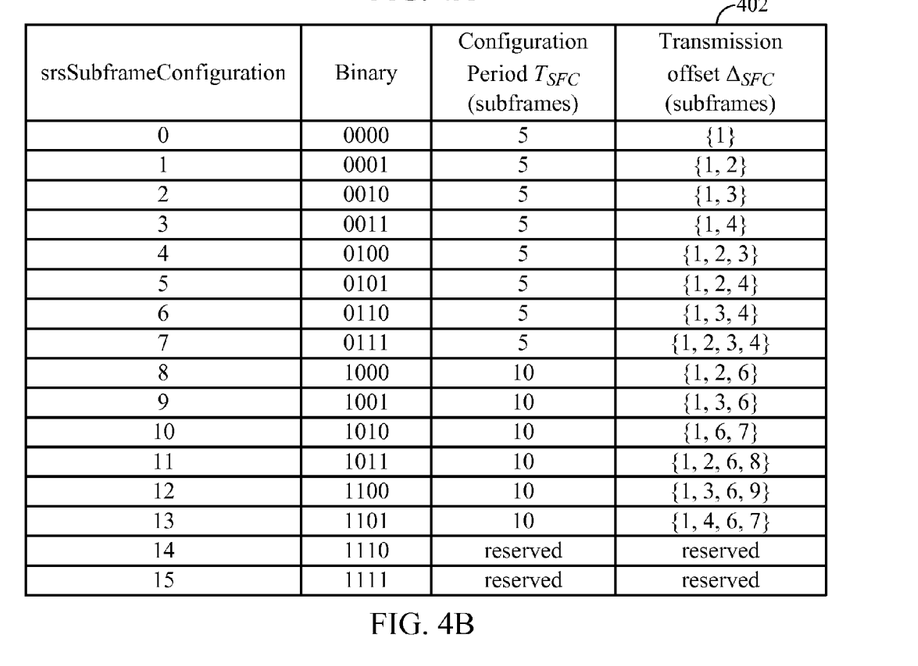

The detailed cell-specific and UE-specific SRS configuration on the periodicity and transmission offset in LTE Rel-8 is discussed in detail in 3GPP TS 36.211 and TS 35.213, respectively. In FIGS. 4A and 4B, a cell-specific subframe configuration period $T_{SFC}$ and cell-specific subframe offset $\Delta_{SFC}$ for the transmission of sounding reference signals are listed in tables 400, 402 for frequency division duplex (FDD) and time division duplex (TDD), respectively. SRSs may be sent in subframes satisfying Equation 1.

$$\lfloor n_s/2 \rfloor \bmod T_{SFC} \in \Delta_{SFC} \quad (1)$$

As a specific example, a UE having a periodicity $T_{SFC}$ of 10 ms and a subframe offset $\Delta_{SFC}$ of {3} may transmit SRS in at least subframes {6, 7, 16, 17, 26, 27}. For TDD, sounding reference signals are transmitted only in configured uplink subframes or UpPTS.

Figure 5A:
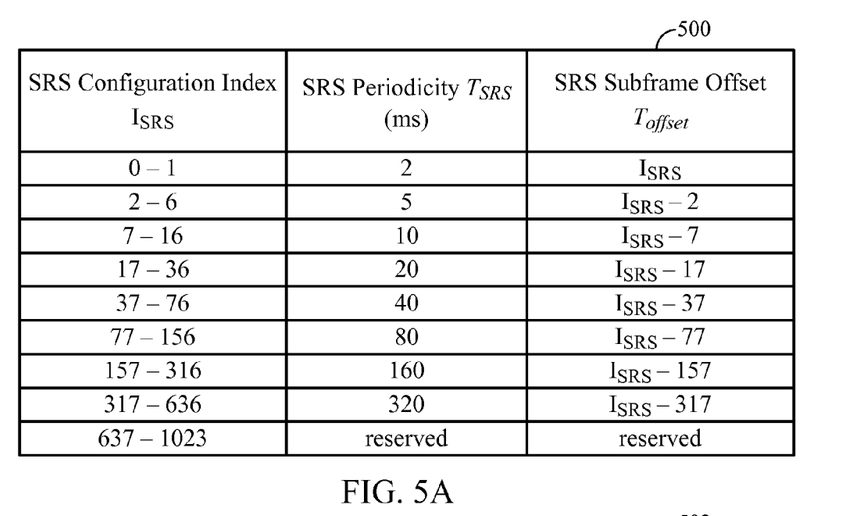
FIGS. 5A-B illustrate example configurations of user-specific sounding reference signals in a frequency and time division duplex system.
Figure 5B:
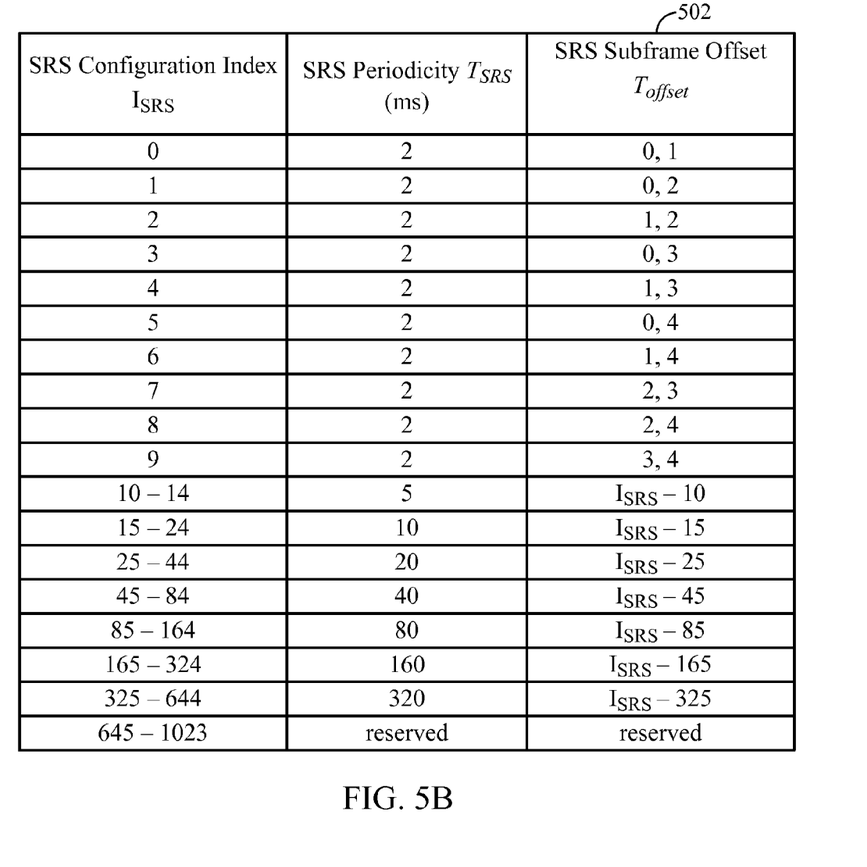

In FIGS. 5A and 5B, UE-specific SRS configurations for SRS periodicity, $T_{SRS}$, and SRS subframe offset, $T_{offset}$, for FDD and TDD are listed in tables 500, 502, respectively. The periodicity $T_{SRS}$ of an SRS transmission may be selected from the set {2, 5, 10, 20, 40, 80, 160, 32} ms or subframes. For the SRS periodicity $T_{SRS}$ of 2 ms in a TDD system, two SRS resources may be configured in a half frame containing uplink subframes. SRS transmission instances for TDD with $T_{SRS}>2$ and for FDD are the subframe satisfying the following Equation 2:

$$(10 \cdot n_f + k_{SRS} - T_{offset}) \bmod T_{SRS} = 0 \quad (2)$$

where $n_f$ is the system frame number, for FDD, $k_{SRS}=\{0, 1, \ldots 9\}$ is the subframe index within the frame, for TDD, $k_{SRS}$ is defined in Table 8.2-3 in TS 36.213. The SRS transmission instances for TDD with $T_{SRS}=2$ are the subframes satisfying the equation:

$$(k_{SRS} - T_{offset}) \bmod 5 = 0. \quad (3)$$

A UE may not transmit a SRS whenever a SRS and a PUSCH transmission corresponding to a Random Access Response Grant or a retransmission of the same transport block as part of the contention-based random access procedure coincide in the subframe. If UE transmission instances always align with the cell-specific transmission instances, the UE may transmit the SRS on its transmission instances with little chance of collision.

However, there are cases when some of the UE-specific SRS transmission instances do not align with the cell-specific transmission instances. In these cases, if the UE sends an SRS anyway, the SRC may collide with other transmissions. These cases may occur when a UE-specific SRS periodicity is not a multiple of the cell-specific SRS periodicity. As a specific example, a UE may have a periodicity of 5 ms while a cell may have a periodicity of 2 ms, and the subframe offset is 0 for both UE and cell SRS. The resulting UE-specific SRS transmission instances of 5, 10, 15, 20, 25, etc., may occasionally align with the cell-specific SRS transmission instances of 2, 4, 5, 6, 8, 10, etc.

These cases may also occur when a UE-specific SRS subframe offset may not align with the cell-specific SRS subframe offset. As a specific example, a UE may have a periodicity of 10 ms with a subframe offset of 0, and a cell may have a periodicity of 2 ms with a subframe offset of 1. The resulting UE-specific SRS transmission instances of 10, 20, 30, 40, etc., do not align at all with the resulting cell-specific SRS transmission instances of 1, 3, 5, 7, 9, 11, etc.

When its SRS transmission instance occurs, a UE may determine whether to transmit the SRS by checking whether its transmission instance falls into, or aligns with, a cell-specific transmission instance. If a UE does not check, then the UE may transmit an SRS that collides with other UEs PUSCH or PUCCH transmissions, resulting in performance loss of other users, waste of its own transmit power, and unnecessary interference.

The SRS transmission instances may fall into or align with a cell-specific SRS transmission instances through the use of careful configuration of an AP. The imposition of a constraint that SRS transmission instances align generally relies on a well managed SRS configuration and implementation at the access point.

According to certain aspects, if a UE determines that, even with a careful configuration from the access point, at least one UE-specific SRS transmission instance does not fall into or align with the cell-specific SRS transmission instance (i.e., a corresponding UE-specific periodicity and transmission offset are not aligned with a cell-specific periodicity and transmission offset), the UE may treat the situation as a misconfiguration. According to certain aspects, as long as there is at least one UE-specific SRS transmission instance that does not belong to the cell-specific SRS transmission instance, the UE may drop all SRS transmissions or, as will be described in greater detail below, the UE may selectively drop only some SRS transmissions.

Figure 6:
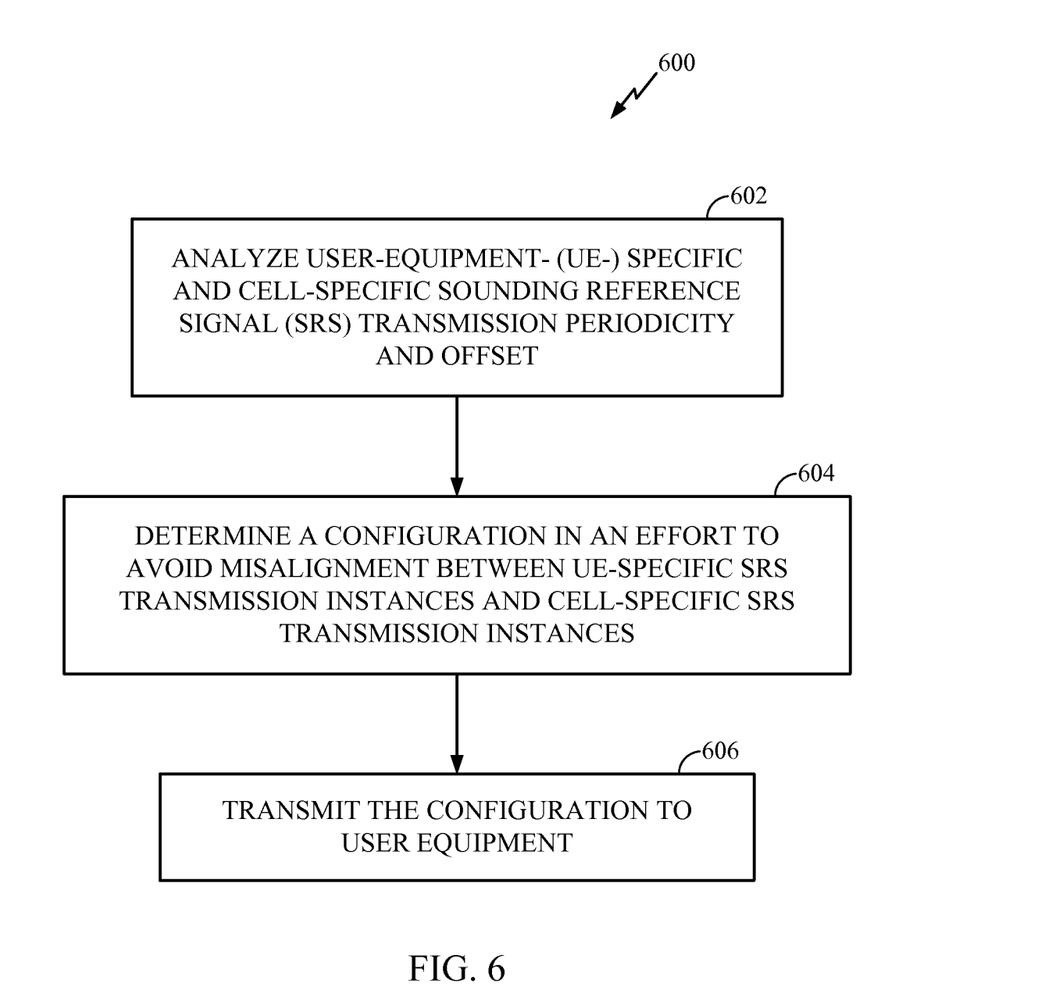
FIG. 6 illustrates example operations that may be performed by an access point in accordance with certain aspects of the present disclosure.

FIG. 6 illustrates example operations 600 that may be performed, for example, at an AP for configuring SRS transmission instance of a wireless system. At 602, an AP may analyze UE-specific and cell-specific SRS transmission factors. According to certain aspects, transmission factors may include SRS periodicity and subframe offset. According to one aspect, the AP may identify in which subframes a UE is scheduled to transmit SRS based on the transmission periodicity and subframe offset. At 604, the AP may determine a configuration designed to avoid, or at least reduce, misalignment between UE-specific SRS transmission instances and cell-specific SRS transmission instances. According to one aspect, the AP may determine that constant alignment is not possible, and may determine a configuration designed to mitigate transmission collisions. According to one aspect, the AP may determine a configuration designed to mitigate transmission collisions. According to certain aspects, a configuration may include parameters for transmission periodicity and subframe offset, maximum SRS bandwidth, specific subframes in which SRS may be transmitted, frequency-domain position, frequency hop size, cyclic shift, and/or transmission comb offset.

At 606, the AP may transmit the determined configuration to a UE in communication with the AP. The AP may package and transmit the determined configuration through any suitable means. In one embodiment, the configuration is transferred through use of a control channel, for example, a broadcast control channel. In another specific example, the configuration is signaled through use of a UE-specific dedicated signaling parameter.

There may be scenarios wherein constant alignment of a UE's SRS transmission instances is not possible. According to certain aspects, an AP may be able to detect such scenarios, and determine a configuration based on other considerations that may not necessarily result in alignment of UE-specific SRS transmission instances and cell-specific SRS transmission instances, but may have other advantages, such as mitigation of collisions.

In some cases, UE-specific and cell-specific SRS transmission periodicities and offsets may result in unavoidable misalignment. According to different aspects, a UE may handle such cases differently (e.g., declaring a misconfiguration, dropping transmissions, etc.).

Figure 7:
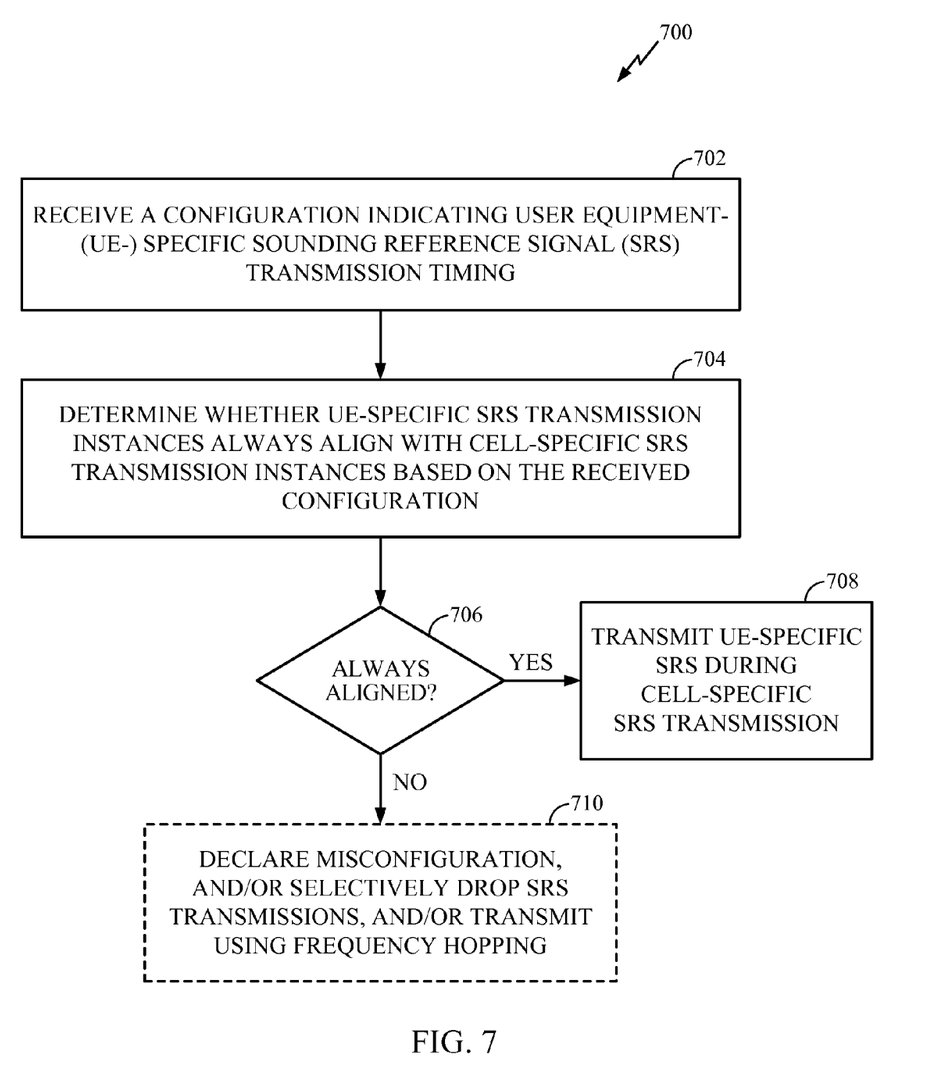
FIG. 7 illustrates an example operation that may be performed by an access terminal in accordance with certain aspects of the present disclosure.

FIG. 7 illustrates example operations 700 that may be executed at a UE. At 702, a UE may receive a configuration from a base station indicating UE-specific SRS transmission timing factors. These SRS transmission timing factors include transmission periodicity and transmission offset. At 704, a UE may determine whether UE-specific and cell-specific SRS transmission instances align, based on the received configuration. According to certain aspects, a UE may determine a schedule of UE-specific and cell-specific SRS transmission instances based on the received configuration, and may analyze the schedule to determine whether the SRS transmission instances are in alignment. According to certain aspects, the determining may comprise identifying in which subframes UE-specific and cell-specific SRS may be transmitted based on a periodicity and offset.

At 706, if the UE-specific transmission instances do align, then, at 708, the UE may transmit the UE-specific SRS during the cell-specific SRS transmission instances. Otherwise, at 710, the UE may perform a predetermined action. According to certain aspects, the predetermined action may include one or more of the following: declaring a misconfiguration, selectively dropping UE-specific SRS transmissions, and transmitting the SRS using frequency hopping.

According to certain aspects, a UE may declare a misconfiguration when it determines UE-specific transmission instances and SRS transmission instances do not always align. UE behavior may or may not be specified, and it is up to the implementation of the individual UE to determine behavior in this scenario.

In one embodiment, a UE may selectively drop UE-specific transmission instances if the UE-specific transmission instances do not belong to the cell-specific SRS transmission instances. The UE may still transmit SRS if the UE-specific instances are aligned with the cell-specific instances. This approach has the following benefits. The effective UE-specific SRS periodicity may be different from the originally configure UE-specific periodicity. The soundable bandwidth for a UE may be limited to a fraction of the cell-specific SRS bandwidth. An AP thus has the flexibility of configuring UEs into different fractions, such as ½, of the cell-specific SRS bandwidth, such that UEs sounding a fraction of the bandwidth are intended to be scheduled using that bandwidth as well as for uplink and/or downlink (when channel reciprocity is applied for TDD).

In one embodiment, a UE may transmit the SRS using frequency hopping if a UE-specific transmission instance does not align with a cell-specific SRS transmission instance. In one specific instance, mentioned above, where a UE has a periodicity of 5 ms while a cell has a periodicity of 2 ms, and the subframe offset is 0 for both UE and cell SRS, the resulting UE-specific SRS transmission instances of 5, 10, 15, 20, 25, etc., may occasionally align with the cell-specific SRS transmission instances of 2, 4, 5, 6, 8, 10, etc. In this specific instance, the UE is effectively transmitting SRS every subframe 0 per radio frame. If frequency hopping is enabled for SRS, the UE may hop within half of the cell SRS bandwidth. This may be one of the desired features when an AP configures UE and cell SRS. Different UE may be configured with different starting frequency domain position indices $n_{RR}$, such that some UEs have SRS hopping using one-half and other UEs using the other half.

Figure 8:
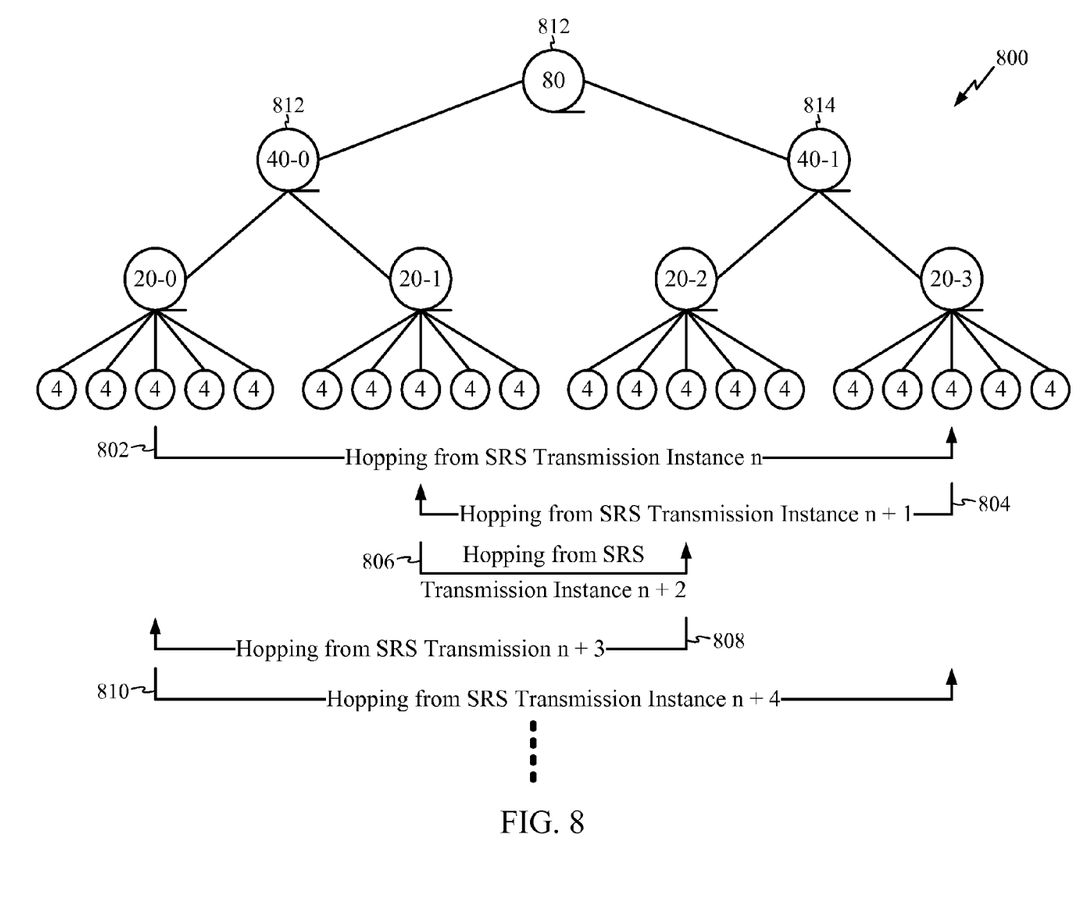
FIG. 8 illustrates example operations that may be performed by an access terminal in accordance with certain aspects of the present disclosure.

FIG. 8 illustrates an example of SRS hopping. In the example depicted, the cell-specific SRS bandwidth is 80 resource blocks (RBs) and the UE-specific SRS bandwidth is 4 RBs. Each circle 812, annotated as "x-y," represents a segment of bandwidth corresponding to y-th index block of x RBs. For example, the circle 814, annotated as "40-1" represents the second block of 40 RBs. In hops 802, 804, 806, 808, 810, a UE SRS transmission instance hops following the sequence recursively through {20-0, 20-3, 20-1, 20-2}. Under each 20-y, a specific 4-RB bandwidth segment is chosen based on the hopping definition discussed in 3GPP TS 36.211. Due to a "mis-alignment" occurring, as discussed above, if a UE only transmits SRS in half of the SRS transmission instances (i.e., once every two SRS transmission instances), the transmissions may, depending on the initial SRS starting location, hop only in between either {20-0,20-1} or {20-2,20-3}, or half of the cell-specific SRS bandwidth. Each UE may effectively only sound half of the cell-specific SRS bandwidth. Different UEs may be configured to sound different halves.

Figure 6A:
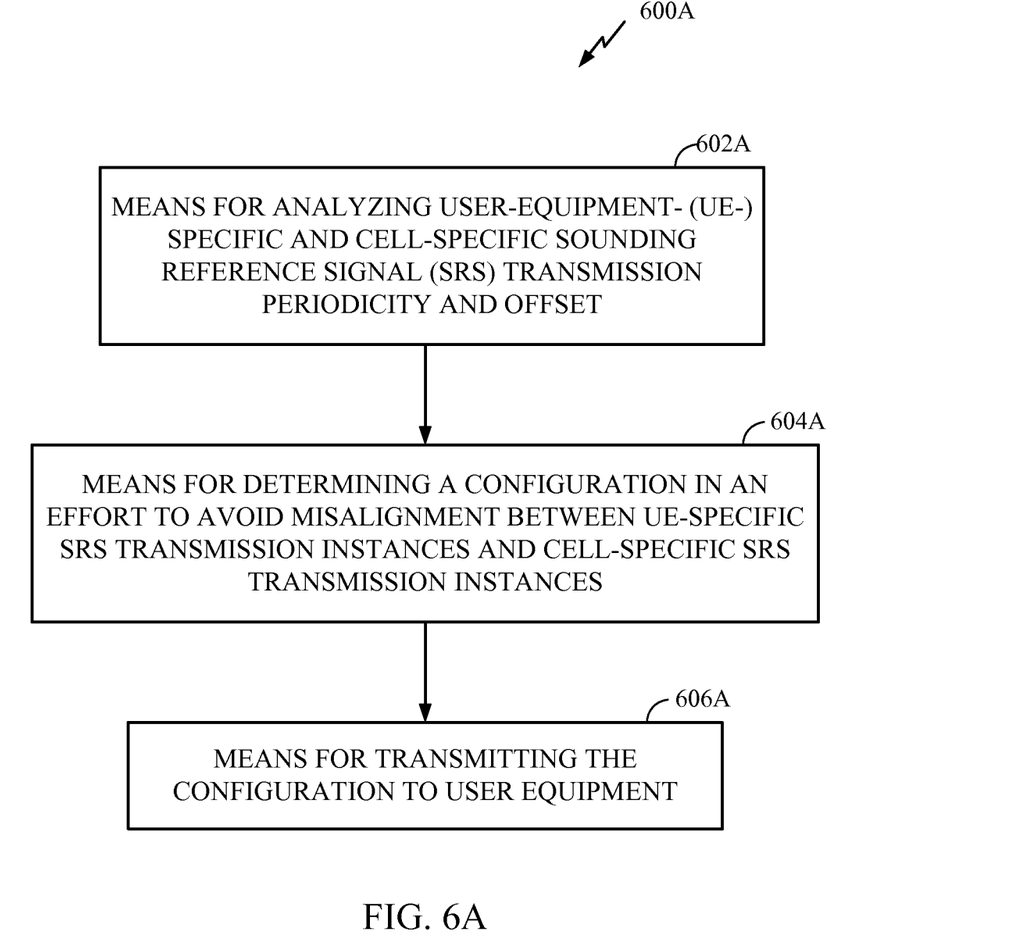
FIGS. 6A and 7A illustrate example components capable of performing operations shown in FIGS. 6 and 7.
Figure 7A:
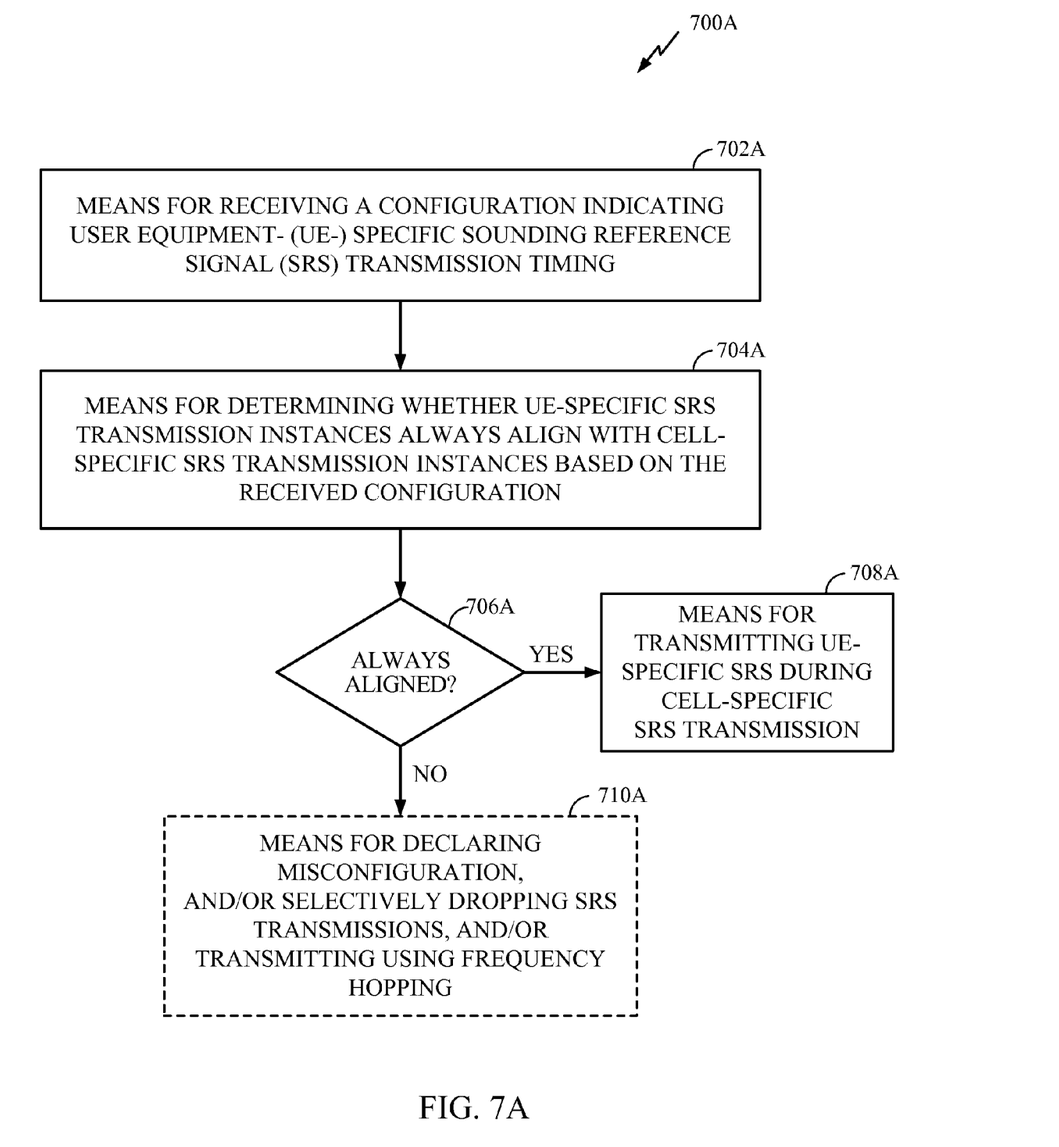

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 600 and 700 illustrated in FIGS. 6 and 7 correspond to means-plus-function blocks 600A and 700A illustrated in FIGS. 6A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for enabling transmission of sounding reference signals, comprising:
concurrently analyzing user-equipment- (UE-) specific and cell-specific sounding reference signal (SRS) transmission timing factors to determine whether at least one UE-specific SRS transmission instance of a UE is aligned with at least one cell-specific SRS transmission instance of the UE;
determining a configuration designed to avoid or at least reduce misalignment between the at least one UE-specific SRS transmission instance of the UE and the at least one cell-specific SRS transmission instance of the UE; and
transmitting the configuration to the UE.

2. The method of claim 1, wherein the transmission timing factors comprise at least SRS transmission periodicity and offset.

3. The method of claim 2, wherein the analyzing comprises identifying in which subframes the UE is scheduled to transmit SRS based on the SRS transmission periodicity and offset.

4. The method of claim 1, wherein the transmitting comprises transmitting the configuration through a broadcast control channel.

5. The method of claim 1, wherein the determining comprises:
determining that constant alignment is not possible, and
determining a configuration designed to mitigate transmission collisions.

6. A method of a user equipment (UE) for enabling transmission of sounding reference signals, comprising:
receiving a configuration indicating user-equipment- (UE-) specific sounding reference signal (SRS) transmission timing;
determining whether a schedule of UE-specific SRS transmission instances of a UE is in alignment with a schedule of cell-specific SRS transmission instances of the UE; and
if not, taking a predetermined action.

7. The method of claim 6, wherein the determining comprises identifying in which subframes UE-specific and cell-specific SRS may be transmitted based on a periodicity and offset.

8. The method of claim 6, wherein the predetermined action comprises declaring a misconfiguration.

9. The method of claim 6, wherein the predetermined action comprises dropping one or more UE-specific SRS in a subset of the UE-specific SRS transmission instances that do not align with the cell-specific SRS transmission instances.

10. The method of claim 6, wherein the predetermined action comprises transmitting UE-specific SRS using frequency hopping.

11. An apparatus for wireless communications, comprising:
   logic for concurrently analyzing user-equipment- (UE-) specific and cell-specific sounding reference signal (SRS) transmission timing factors to determine whether at least one UE-specific SRS transmission instance of a UE is aligned with at least one cell-specific SRS transmission instance of the UE;
   logic for determining a configuration designed to avoid or at least reduce misalignment between the at least one UE-specific SRS transmission instance of the UE and the at least one cell-specific SRS transmission instance of the UE; and
   logic for transmitting the configuration to the UE.

12. The apparatus of claim 11, wherein the transmission timing factors comprise at least SRS transmission periodicity and offset.

13. The apparatus of claim 12, wherein the logic for analyzing comprises logic for identifying in which subframes the UE is scheduled to transmit SRS based on the SRS transmission periodicity and offset.

14. The apparatus of claim 11, wherein the logic for transmitting comprises logic for transmitting the configuration through a broadcast control channel.

15. The apparatus of claim 11, wherein the logic for determining comprises:
   logic for determining that constant alignment is not possible, and
   logic for determining a configuration designed to mitigate transmission collisions.

16. An apparatus for wireless communications, comprising:
   logic for receiving a configuration indicating user-equipment- (UE) specific sounding reference signal (SRS) transmission timing;
   logic for determining whether a schedule of UE-specific SRS transmission instances of a UE is in alignment with a schedule of cell-specific SRS transmission instances of the UE; and
   logic for taking a predetermined action if the schedule of UE-specific SRS transmission instances is not in alignment.

17. The apparatus of claim 16, wherein the logic for determining comprises logic for identifying in which subframes UE-specific and cell-specific SRS may be transmitted based on a periodicity and offset.

18. The apparatus of claim 16, wherein the predetermined action comprises declaring a misconfiguration.

19. The apparatus of claim 16, wherein the predetermined action comprises dropping one or more UE-specific SRS in a subset of the UE-specific SRS transmission instances that do not align with the cell-specific SRS transmission instances.

20. The apparatus of claim 16, wherein the predetermined action comprises transmitting UE-specific SRS using frequency hopping.

21. An apparatus for wireless communications, comprising:
   means for concurrently analyzing user-equipment- (UE-) specific and cell-specific sounding reference signal (SRS) transmission timing factors to determine whether at least one UE-specific SRS transmission instance of a UE is aligned with at least one cell-specific SRS transmission instance of the UE;
   means for determining a configuration designed to avoid or at least reduce misalignment between the at least one UE-specific SRS transmission instance of the UE and the at least one cell-specific SRS transmission instance of the UE; and
   means for transmitting the configuration to the UE.

22. The apparatus of claim 21, wherein the transmission timing factors comprise at least SRS transmission periodicity and offset.

23. The apparatus of claim 22, wherein the means for analyzing comprises means for identifying in which subframes the UE is scheduled to transmit SRS based on the SRS transmission periodicity and offset.

24. The apparatus of claim 21, wherein the means for transmitting comprises the means for transmitting the configuration through a broadcast control channel.

25. The apparatus of claim 21, wherein the means for determining comprises:
   means for determining that constant alignment is not possible, and
   means for determining a configuration designed to mitigate transmission collisions.

26. An apparatus for wireless communications, comprising:
   means for receiving a configuration indicating user-equipment- (UE) specific sounding reference signal (SRS) transmission timing;
   means for determining whether a schedule of UE-specific SRS transmission instances of a UE is in alignment with a schedule of cell-specific SRS transmission instances of the UE; and
   means for taking a predetermined action if the schedule of UE-specific SRS transmission instances is not in alignment.

27. The apparatus of claim 26, wherein the means for determining comprises means for identifying in which subframes UE-specific and cell-specific SRS may be transmitted based on a periodicity and offset.

28. The apparatus of claim 26, wherein the predetermined action comprises declaring a misconfiguration.

29. The apparatus of claim 26, wherein the predetermined action comprises dropping one or more UE-specific SRS in a subset of the UE-specific SRS transmission instances that do not align with the cell-specific SRS transmission instances.

30. The apparatus of claim 26, wherein the predetermined action comprises transmitting UE-specific SRS using frequency hopping.

31. A computer-program product for wireless communications, comprising a non-transitory computer readable medium having instructions stored thereon, the instructions being executable by one or more processors and the instructions comprising:
   instructions for concurrently analyzing user-equipment- (UE-) specific and cell-specific sounding reference signal (SRS) transmission timing factors to determine whether at least one UE-specific SRS transmission instance of a UE is aligned with at least one cell-specific SRS transmission instance of the UE;
   instructions for determining a configuration designed to avoid or at least reduce misalignment between the at least one UE-specific SRS transmission instance of the UE and the at least one cell-specific SRS transmission of the UE; and
   instructions for transmitting the configuration to the UE.

32. The computer-program product of claim 31, wherein the transmission timing factors comprise at least SRS transmission periodicity and offset.

33. The computer-program product of claim 32, wherein the instructions for analyzing comprises instructions for identifying in which subframes the UE is scheduled to transmit SRS based on the SRS transmission periodicity and offset.

34. The computer-program product of claim 31, wherein the instructions for transmitting comprises transmitting the configuration through a broadcast control channel.

35. The computer-program product of claim 31, wherein the instructions for determining comprises:
  instructions for determining that constant alignment is not possible, and
  instructions for determining a configuration designed to mitigate transmission collisions.

36. A computer-program product for wireless communications, comprising a non-transitory computer readable medium having instructions stored thereon, the instructions being executable by one or more processors and the instructions comprising:
  instructions for receiving a configuration indicating user-equipment- (UE) specific sounding reference signal (SRS) transmission timing;
  instructions for determining whether a schedule of UE-specific SRS transmission instances of a UE is in alignment with a schedule of cell-specific SRS transmission instances of the UE; and
  instructions for taking a predetermined action if the schedule of UE-specific SRS transmission instances is not in alignment.

37. The computer-program product of claim 36, wherein the instructions for determining comprises identifying in which subframes UE-specific and cell-specific SRS may be transmitted based on a periodicity and offset.

38. The computer-program product of claim 36, wherein the predetermined action comprises declaring a misconfiguration.

39. The computer-program product of claim 36, wherein the predetermined action comprises dropping one or more UE-specific SRS in a subset of the UE-specific SRS transmission instances that do not align with the cell-specific SRS transmission instances.

40. The computer-program product of claim 36, wherein the predetermined action comprises transmitting UE-specific SRS using frequency hopping.

41. An apparatus for wireless communications, comprising:
  at least one processor configured to
    concurrently analyze user-equipment- (UE-) specific and cell-specific sounding reference signal (SRS) transmission timing factors to determine whether at least one UE-specific SRS transmission instance of a UE is aligned with at least one cell-specific SRS transmission instance of the UE;
    determine a configuration designed to avoid or at least reduce misalignment between the at least one UE-specific SRS transmission instance of the UE and the at least one cell-specific SRS transmission instance of the UE; and
    transmit the configuration to the UE; and
  a memory coupled to the at least one processor.

42. The apparatus of claim 41, wherein the transmission timing factors comprise at least SRS transmission periodicity and offset.

43. The apparatus of claim 42, wherein the analyzing comprises identifying in which subframes the UE is scheduled to transmit SRS based on the SRS transmission periodicity and offset.

44. The apparatus of claim 41, wherein the transmitting comprises transmitting the configuration through a broadcast control channel.

45. The apparatus of claim 41, wherein the determining comprises:
  determining that constant alignment is not possible, and
  determining a configuration designed to mitigate transmission collisions.

46. An apparatus for wireless communications, comprising:
  at least one processor configured to
    receive a configuration indicating user-equipment- (UE) specific sounding reference signal (SRS) transmission timing,
    determine whether a schedule of UE-specific SRS transmission instances of a UE is in alignment with a schedule of cell-specific SRS transmission instances of the UE, and
    take a predetermined action if the schedule of UE-specific SRS transmission instances is not in alignment; and
  a memory coupled to the at least one processor.

47. The apparatus of claim 46, wherein the determining comprises identifying in which subframes UE-specific and cell-specific SRS may be transmitted based on a periodicity and offset.

48. The apparatus of claim 46, wherein the predetermined action comprises declaring a misconfiguration.

49. The apparatus of claim 46, wherein the predetermined action comprises dropping one or more UE-specific SRS in a subset of the UE-specific SRS transmission instances that do not align with the cell-specific SRS transmission instances.

50. The apparatus of claim 46, wherein the predetermined action comprises transmitting UE-specific SRS using frequency hopping.

* * * * *